No. 835,379. PATENTED NOV. 6, 1906.
W. W. TEDFORD.
FERTILIZER DISTRIBUTER.
APPLICATION FILED APR. 18, 1906.

Witnesses
B. K. Reichenbach
F. B. MacNat.

Inventor
W. W. Tedford.
By

UNITED STATES PATENT OFFICE.

WALKER W. TEDFORD, OF AUSTIN, ARKANSAS.

FERTILIZER-DISTRIBUTER.

No. 835,379.  Specification of Letters Patent.  Patented Nov. 6, 1906.

Application filed April 18, 1906. Serial No. 312,478.

*To all whom it may concern:*

Be it known that I, WALKER W. TEDFORD, a citizen of the United States, residing at Austin, in the county of Lonoke, State of Arkansas, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer-distributers; and the several objects thereof are to provide a simple, effective, and inexpensive device of this nature which may be used in distributing and pulverizing fertilizer and the like, to provide means for simultaneously adjusting the valves for opening and closing the feed-openings, and to provide means for retaining alternate valves in their closed position.

The invention will be more readily understood from the following detailed description and from an inspection of the accompanying drawings, in which—

Figure 1:
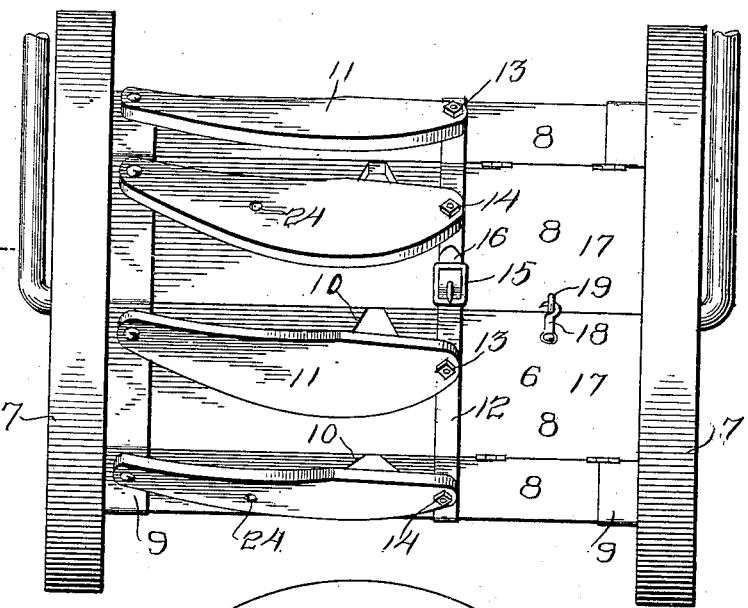
Figure 2:
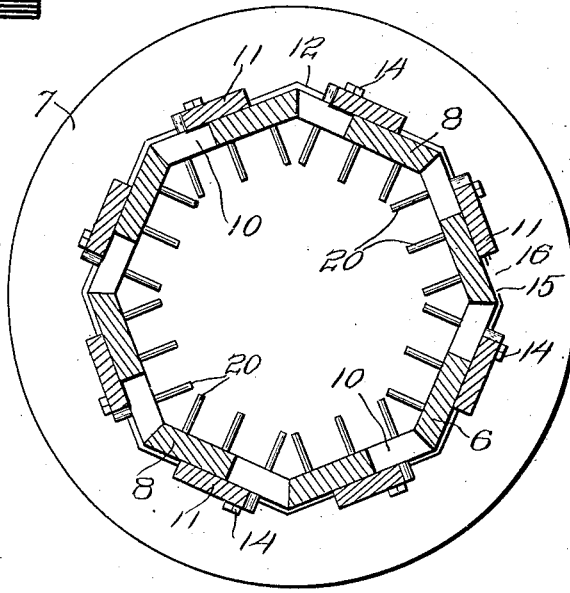
Figure 3:
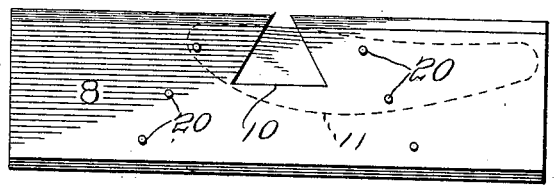

Figure 1 is a front elevation of a distributer constructed in accordance with this invention. Fig. 2 is a transverse section. Fig. 3 is a detail of one of the sides of the distributer, showing in dotted lines a valve operating in connection with the feed-opening.

Like parts are designated by corresponding reference-numerals in the several views.

Referring to the drawings, 6 designates as a whole a distributer-drum to the ends of which are attached wheels 7, by means of which the drum is rotated. The drum is in the form of a polyhedron, having, in the present instance, eight sides 8. The sides are held in place by means of metallic straps 9, bolted thereto. Each side of the drum is provided with a feed-opening 10, triangular in form and adapted to be opened or closed by a valve 11, pivoted at its outer end to each of the sides 8, adjacent one of the wheels 7 and having its inner end attached to a flexible band 12 by means of a bolt 13, having a nut 14. Said band embraces drum 6 and is provided at its opposite ends with a buckle 15 and tongue 16 to enable said band to be sufficiently tightened upon the drum to retain it firmly in place thereon, the several valves being each attached to said band, as above noted, so that it will be seen to lie between the outer face of the drum sides and the inner face of the valves.

As seen in Fig. 2, the interior of each side of the drum is provided with a series of projecting pins or nails 20, which are arranged in rows parallel to the converging sides of the triangular feed-opening. When the drum is rotated, the fertilizer contained therein and carried around by the rotation of the drum will come in contact with said nails and be broken or pulverized thereby, due to the fact that as the drum rotates its contents will be carried around and lifted up some distance and that on the further rotation the contents will fall of its own weight upon the lower nails. The nails will also act to hold all chips, &c., on the points thereof and prevent the feed-openings from being choked.

The drum is filled through an opening provided by cutting away the inner end of two adjacent sides 8, as shown in Fig. 1, such opening being closed during the operation of the device by a pair of doors 17, each of which is hinged to the side adjacent the cut-away portions, the doors being held in such position by means of a hook 18 and eye 19, attached at their meeting edges.

In use the drum is filled, as above described, and the valves are set by means of the flexible band 12. The device is then attached to an ordinary plow, or it may be attached to a handle and rotated manually.

It will be noted from an inspection of Fig. 1 that there is a small opening 24 provided in every other side 8 of the drum and its corresponding valve. The purpose of this construction is to admit of said valve being held in fixed position with the corresponding feed-opening closed when it is desired to put the fertilizer into hills. The valves are retained in such position by removing their corresponding bolts from the band and inserting same into the opening 24, in which they are retained by the nuts 14.

While the device is intended originally for use as a fertilizer-distributer, it may be used to sow corn, grass-seed, and the like.

By forming the several feed-openings with the apices adjacent the meeting edges of the various sides it is possible to more exactly regulate the flow of the fertilizer through said openings.

What is claimed is—

1. A device of the kind described comprising a polyhedric drum, each of the sides of said drum being provided with a feed-opening; a valve for opening or closing each of said feed-openings; and means for adjusting all of said valves simultaneously.

2. A device of the kind described comprising a polyhedric drum, each side of said drum being provided with a feed-opening; a valve for opening or closing each of said feed-openings; and a band to which said valves are connected, to simultaneously adjust all of said valves.

3. A device of the kind described comprising a polyhedric drum, each of the sides of said drum being provided with a feed-opening; a valve for opening and closing each of said feed-openings; said valves being connected at one end to the respective sides of said drum; and a band connecting the opposite ends of each of said valves, to adjust said valves simultaneously.

4. A device of the kind described comprising a polyhedric drum, each of the sides of said drum being provided with a feed-opening; a transversely-movable valve on each of the sides of said drum adjacent each of said feed-openings; and a flexible band embracing said drum and to which each valve is connected, to simultaneouly open and close each of said feed-openings.

5. A device of the kind described comprising a polyhedric drum; wheels attached to the ends of said drum; each of the sides of said drum being provided with a feed-opening; pulverizing means on the interior of each side of said drum; a valve attached at one end to each of said sides for opening or closing the feed-opening therein; and a flexible band embracing said drum, and to which said valves are connected at their opposite ends, to simultaneously adjust said valves.

6. A device of the kind described comprising a polyhedric drum; wheels attached to the ends of said drum; each of the sides of said drum having a triangular feed-opening; a series of projections on the interior of each side of said drum; said projections being arranged in converging series, parallel with the sides of the feed-openings; a valve to open and close each feed-opening; and a flexible band embracing said drum, and to which said valves are connected, to simultaneously adjust said valves.

7. A device of the kind described comprising a polyhedric drum; wheels attached to the ends of said drum; each side of said drum being provided with a feed-opening; a valve for opening and closing each of said feed-openings; a flexible band embracing said drum and to which each valve is detachably connected, to simultaneously adjust said valves; and means for retaining the alternate valves in their closed positions.

8. A device of the kind described comprising a polyhedric drum, and means for rotating the same; each side of said drum being provided with a triangular feed-opening; a valve for opening and closing each feed-opening; projections on the inner face of each side, said perforations being arranged in rows parallel to the converging sides of said feed-openings; a flexible band embracing said drum and to which said valves are detachably connected; the alternate sides of said drum being provided with an opening, and the corresponding valves being likewise provided with an opening adapted to aline with the side opening, when said valves are adjusted to close the feed-openings; and a bolt passing through said valves and sides to retain said valves in such position.

In testimony whereof I affix my signature in presence of two witnesses.

WALKER W. TEDFORD.

Witnesses:
MILTON C. HOUSE,
EARNEST E. GUNNELL.